US007136653B2

(12) United States Patent
Lemke

(10) Patent No.: US 7,136,653 B2
(45) Date of Patent: Nov. 14, 2006

(54) WIRELESS BASE STATION SUPPORTING MULTIPLE HYPERBANDS

(75) Inventor: Michael John Lemke, Plainfield, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 439 days.

(21) Appl. No.: 10/109,027

(22) Filed: Mar. 28, 2002

(65) Prior Publication Data

US 2003/0186701 A1    Oct. 2, 2003

(51) Int. Cl.
*H04Q 7/20* (2006.01)
(52) U.S. Cl. .................. 455/448; 455/444; 455/449
(58) Field of Classification Search ............... 455/446, 455/448, 434, 552.1, 422.1, 436, 433, 439, 455/449, 444, 443, 426.1, 454, 560; 370/331
See application file for complete search history.

(56) References Cited

U.S. PATENT DOCUMENTS

| 6,094,579 | A | * | 7/2000 | Olvera-Hernandez et al. ... 455/437 |
| 6,157,668 | A | * | 12/2000 | Gilhousen et al. .......... 375/130 |
| 6,188,911 | B1 | * | 2/2001 | Wallentin et al. ........... 455/524 |
| 6,259,915 | B1 | * | 7/2001 | Raith ......................... 455/434 |
| 6,282,408 | B1 | * | 8/2001 | Jang ......................... 455/67.13 |
| 6,374,111 | B1 | * | 4/2002 | Briere et al. ............. 455/452.1 |
| 6,473,616 | B1 | * | 10/2002 | Sydor ......................... 455/446 |
| 6,546,250 | B1 | * | 4/2003 | Turcotte et al. ............. 455/437 |
| 6,567,665 | B1 | * | 5/2003 | Kissee ........................ 455/436 |
| 6,580,924 | B1 | * | 6/2003 | Lu et al. ..................... 455/560 |
| 6,654,364 | B1 | * | 11/2003 | Mansour ..................... 370/342 |
| 6,879,825 | B1 | * | 4/2005 | Daly .......................... 455/419 |
| 2002/0042271 | A1 | * | 4/2002 | Choi et al. .................. 455/437 |
| 2003/0016639 | A1 | * | 1/2003 | Kransmo et al. ........... 370/335 |
| 2003/0125039 | A1 | * | 7/2003 | Lachtar et al. ............. 455/453 |
| 2004/0157597 | A1 | * | 8/2004 | Comer et al. ............ 455/426.1 |

* cited by examiner

*Primary Examiner*—Eliseo Ramos-Feliciano
*Assistant Examiner*—Dai Phuong

(57) ABSTRACT

A cellular communications network providing multi-hyperband capability comprises a mobile switching center acting as a data administration and call control center for a plurality of cells, each cell divided into one or more sectors. A plurality of communications links connect the mobile switching center to associated cells. Each sector is capable supporting one or more hyperbands. Entities representing sector-specific data are differentiated from hyperband-specific entities. Thus, a sector-related message transmitted via the communications links comprises a cell and sector number key and a plurality of parameters related to the cell and sector number, and a hyperband-related message transmitted via the communications links comprises a hyperband key, wherein the hyperband key corresponds to one of the supported multiple hyperbands, and a plurality of parameters related to the hyperband corresponding to the hyperband key.

16 Claims, 4 Drawing Sheets

WIRELESS BASE STATION SUPPORTING MULTIPLE HYPERBANDS

FIELD OF THE INVENTION

This invention relates to cellular telecommunications networks and, more particularly, to a wireless base station software solution for supporting multiple hyperbands.

BACKGROUND OF THE INVENTION

Cellular systems perform communications based on the cell unit. A cell is the geographic service area covered by a Base Station Transceiver Subsystem (BTS). In general, a cell is classified as an omni-cell or a three-sector cell. The sector represents the coverage angle of an antenna face, for example 120 degrees for a three-sector cell and 360 degrees for an omni-cell. A mobile station communicates with a base station that supports the cell within which the mobile station is located. The communication is performed via forward and reverse communication channels.

Certain cellular telecommunications networks have traditionally operated in the 824–849 MHz range, also known as the cellular hyperband. A more recent evolution in cellular telecommunications involves the adoption of the 1900 MHz hyperband for use in handling mobile and personal communications. The 1900 MHz hyperband is also known as the Personal Communication Services (PCS) hyperband. Standards that define cellular telephone operations in North America include the intersystem signaling standard IS-41 that is incorporated by reference herein.

Each of the frequency bands specified for the cellular and PCS hyperbands is allocated a plurality of voice or speech channels and at least one access or control channel. The control channel is used to control or supervise the operation of mobile stations by means of information transmitted to and received from the mobile stations. Such information may include, but is not limited to, incoming call signals, outgoing call signals, page signals, page response signals, location registration signals, voice channel assignments, maintenance instructions, short message service (SMS) messages, and cell selection or reselection instructions as mobile stations travel out of the radio coverage of one cell and into the radio coverage of another cell. The voice channel is used to carry subscriber telephonic communications as well as messages requesting mobile station assistance in making hand-off evaluations. The control and voice channels may operate in either an analog mode or a digital mode.

Many wireless service providers are beginning to supplement their existing RF spectrum with additional spectrum purchased from the other hyperband in order to increase network capacity. Legacy cell equipment is designed to support only a single hyperband. New systems simultaneously supporting both current wireless hyperbands (Cellular and PCS) are being designed. This presents the problem of supporting both hyperbands in the same cell, without completely altering the existing infrastructure designed to support cells of a single hyperband. In addition, future spectrum is planned for auction, thus further compounding the problem. Accordingly, the proposed solution should be easily expandable to support additional hyperbands.

Existing cellular telephone networks may have to simultaneously support radio telecommunications on multiple frequency bands. One solution is to have a mobile switching center (MSC) control transmission and reception equipment at one or more geographically coincident base stations to operate one cell in the cellular hyperband and another cell in PCS hyperband. In addition, adjacent exchanges, controlled by different MSCs, may have cells that operate in the cellular hyperband or cells operating in both the cellular and PCS hyperbands. However, the cells serving the cellular hyperband and the cells serving the PCS hyperband, although possibly covering the same area, are typically treated as independent cells. This solution has the disadvantage of artificially increasing the number of cells that must be supported by the wireless infrastructure, and the coordination of handoffs from one sector to another, as a mobile moves from one reception area to another, becomes a more complicated function.

It would be a distinct advantage to have a solution for supporting multiple hyperbands that is easily expandable to support additional hyperbands. It is an object of the present invention to provide such a solution.

SUMMARY OF THE INVENTION

The present invention is directed to a cellular communications network providing multi-hyperband capability. The network comprises a plurality of cells, wherein each cell comprises at least one sector and wherein each sector supports at least one hyperband. A plurality of communications links are provided, with each link connected to a cell and an associated multi-hyperband capable Mobile Switching Center. The Mobile Switching Center acts as a data administration and call control system for the plurality of cells such that the Mobile Switching Center controls which sector a mobile is connected to by sending and receiving sector-related parameter messages to and from the plurality of cells separately from hyperband-related parameter messages.

An object of the present invention is to provide a scalable method of supporting multiple hyperbands that is easily modified to support new hyperbands in the future.

It is another object of the present invention is to provide a scalable method of supporting multiple hyperbands that does not require modifying message data structures that contain data not related to the hyperband.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination of the various parts of the apparatus, and/or the steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENT

Existing systems define a cell as a collection of RF transmission patterns called sectors (or antenna faces) that share common properties. However, many transmission characteristics vary across the sectors of a cell. Most transmission-effecting parameters are administered at the sector level. Different hyperbands require different transmission characteristics very similar to the differences in characteristics between sectors. From a software perspective, it may be deemed advantageous to view separate hyperbands sharing the same RF transmission pattern as independent sectors. This view provides each hyperband with the necessary data structures to support its unique transmission characteristics.

Figure 1:
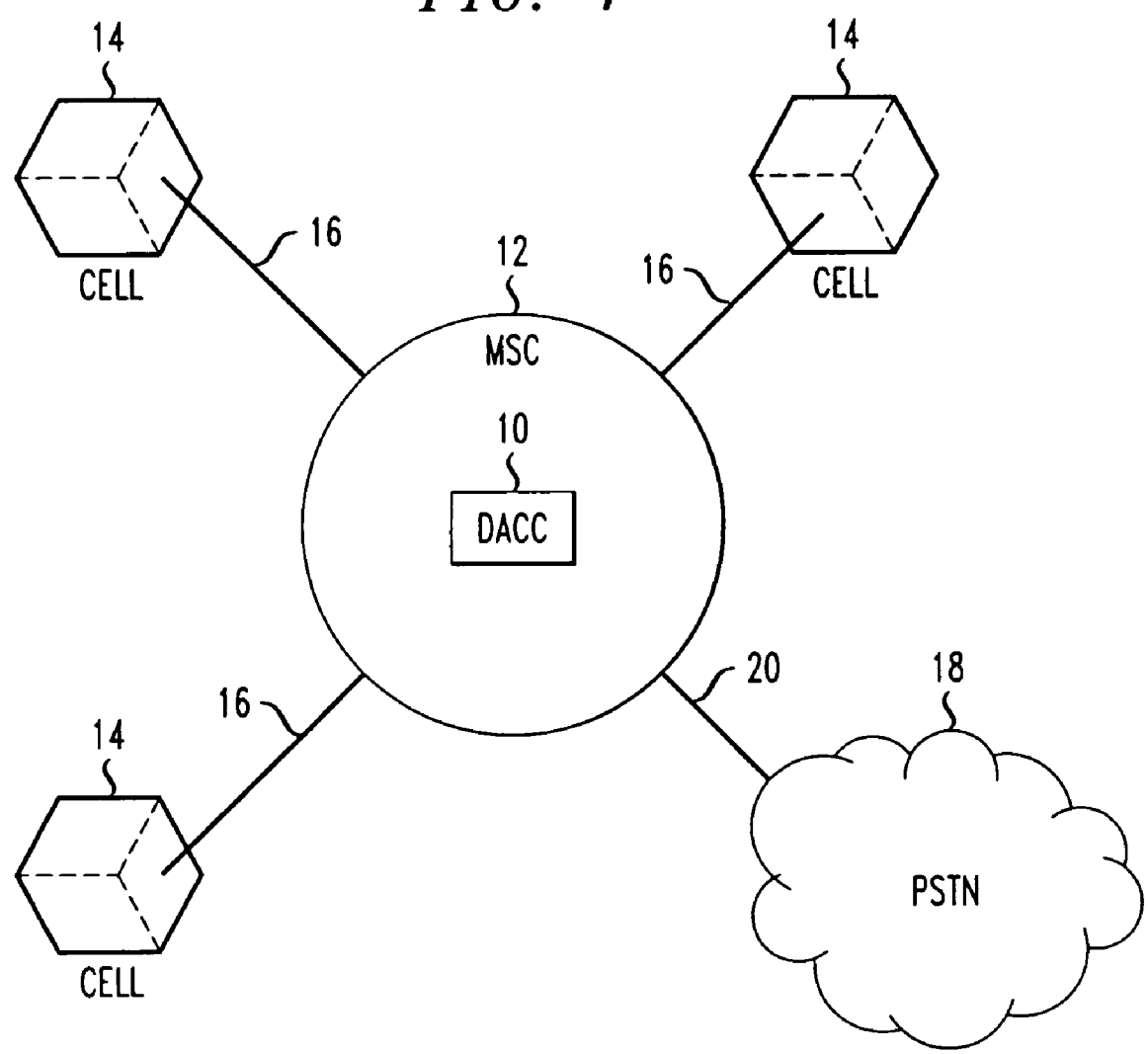
FIG. 1 is a diagram of a portion of a cellular network suitable for incorporating an embodiment of the present invention.

FIG. 1 illustrates in an abstracted form, providing sufficient detail for the purpose of explaining the present invention, the organization of a cellular network. A Data Administration Call Control (DACC) system 10 is within a Mobile Switching Center 12 in order to control the operation of cells connected to the MSC. The MSC 12 is in communication with cells 14 through communications links 16 and is also connected to the Public Switched Telephone Network (PSTN) 18 through communications link 20.

Figure 2:
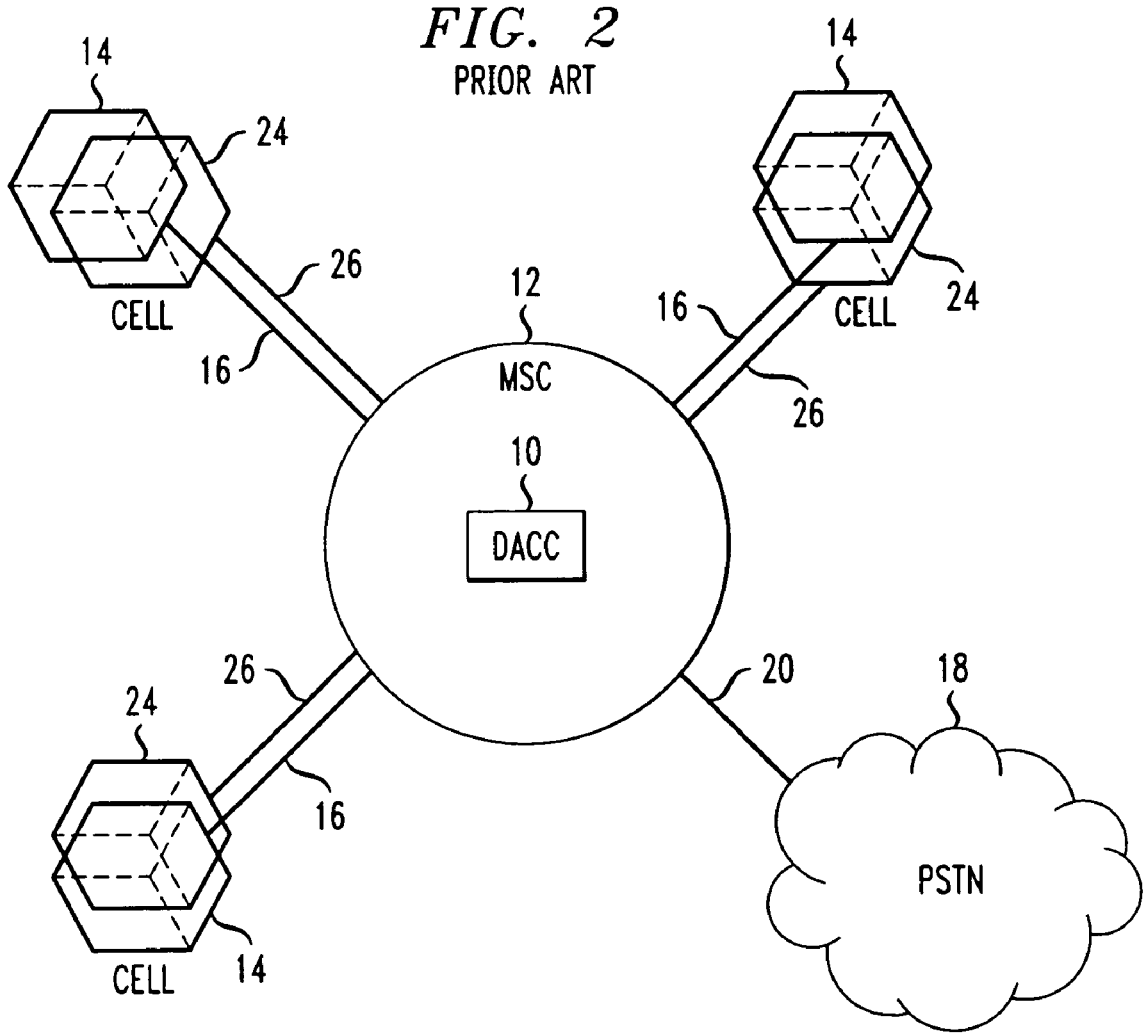
FIG. 2 is a diagram illustrating a prior art method of servicing multiple hyperbands.

FIG. 2 illustrates a prior-art solution for providing multiple hyperband support, for the cellular and PCS hyperbands. The cellular network is organized like the one shown in FIG. 1, however, cells 24 have been added to the network. These new cells are geographically coincident with the original cells 14, however, they are treated as independent cells, and the new cells 24 communicate with the MSC through their own communications links 26. In this configuration, cells 14 may, for example, serve the cellular hyperband, while cells 24 serve the PCS hyperband. This solution, while simple to understand and implement, has a number of disadvantages including the aforementioned disadvantages of artificially increasing the number of cells that must be supported by the wireless infrastructure, and the more complicated coordination of handoffs from one sector to another as a mobile moves from one reception area to another.

Figure 3:
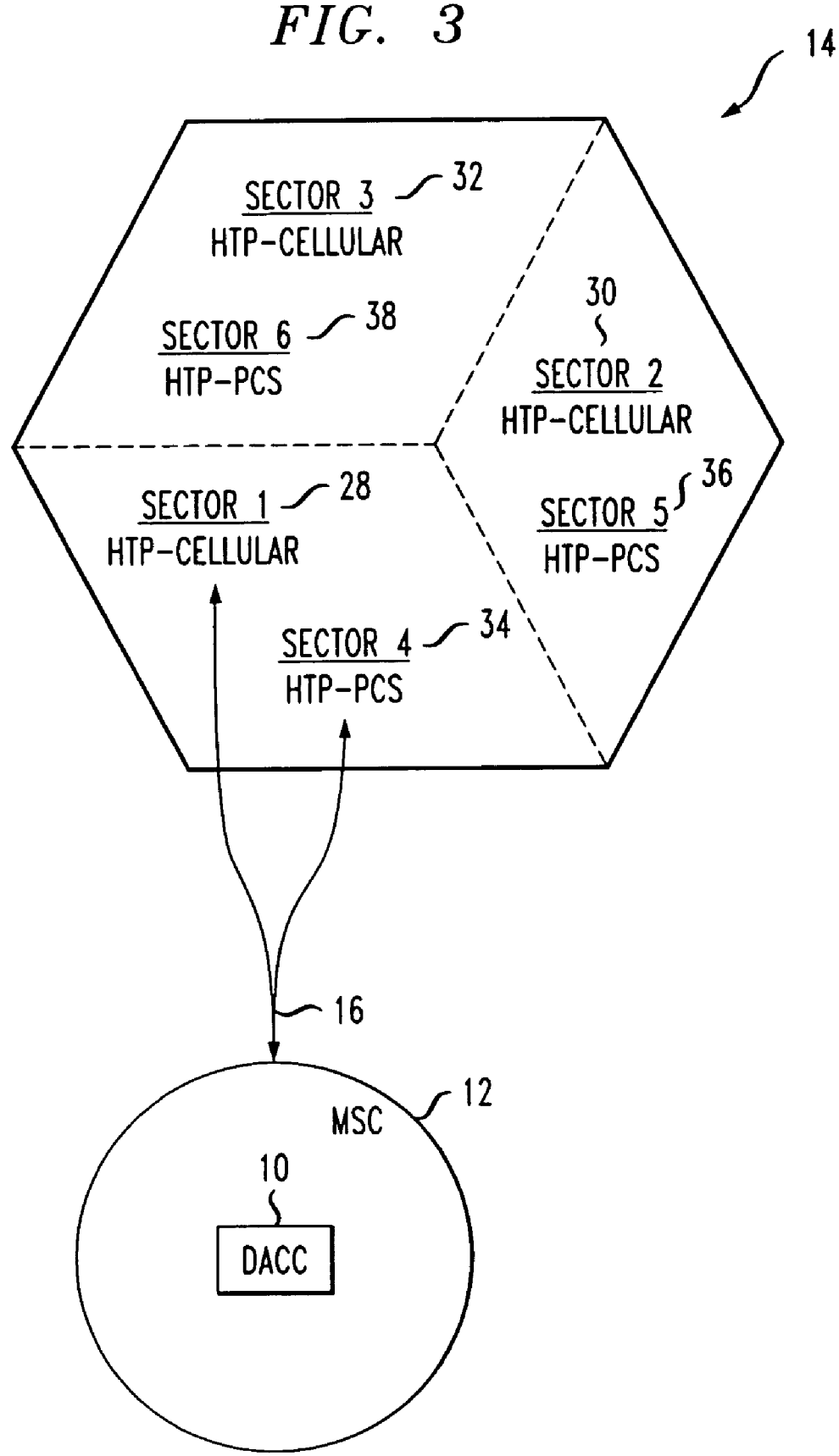
FIG. 3 is a diagram illustrating an alternate solution for providing multiple hyperband service.

FIG. 3 illustrates conceptually an alternate solution for supporting two hyperbands, cellular and PCS, in the same cell, although more than two hyperbands may be supported in a similar fashion. Cell 14 is divided physically into 3 sectors as before, with each antenna face covering a 120 degree angle, however, the cell is logically divided into 6 sectors, 28-38, numbered 1 through 6. Sectors 28-32, that provide cellular service, are numbered 1-3, and sectors 34-38, that provide PCS service, are numbered 4-6. Notice that sector numbers 1 and 4 cover the same physical area. The same is true of sector numbers 2 and 5, and also for sector numbers 3 and 6. The MSC 12 selects the appropriate sector number according to whether cellular or PCS service is preferred. Whereas the above-described prior-art solution presented a view having additional cells providing service to additional hyperbands, this alternate solution presents a view having the original number of cells, but having additional sectors in each cell.

Implementing separate sectors for each hyperband within a transmission pattern, however, can potentially present a problem in certain circumstances insomuch as such an implementation may increase the total number of sectors that are supported within a single cell. Often, existing software structures place limits on the total number of sectors that a cell can support, and changing this maximum value can be expensive. In addition, this approach may lead to increasing the maximum value to account for the current 2 hyperbands, and then having to make a similar change later to accommodate additional hyperbands with each future expansion in wireless spectrum.

In an alternate embodiment, it is proposed that multiple hyperbands be assigned within each sector. A cell may still contain a limited number of numbered sectors. These sectors, however, are differentiated from the entities that define the transmission characteristics for each hyperband within a sector. According to concepts of the present invention, the respective entities are differentiated by treating the transmission area as an RF sector entity, and the parameters defining a hyperband within an RF sector as a Hyperband Transmission Pattern (HTP) entity. Using these definitions, a cell is made up of a limited number of RF sectors that remains unchanged from what was required prior to including multiple hyperbands. However, where the aforementioned approach provided a one-to-one mapping of RF sector to HTP, the new entity provides a one to many mapping of sector to HTP. With current definitions of wireless RF spectrum, an RF sector will support one or more HTPs from one or more hyperbands (cellular or PCS). The existing software structures that are used to represent the transmission characteristics of a sector are modified to contain a new key field for hyperband, representing the HTP. Beyond adding the new key field to the structure, the rest of the data structure remains intact. This approach simplifies growing to support additional hyperbands.

Figure 4:
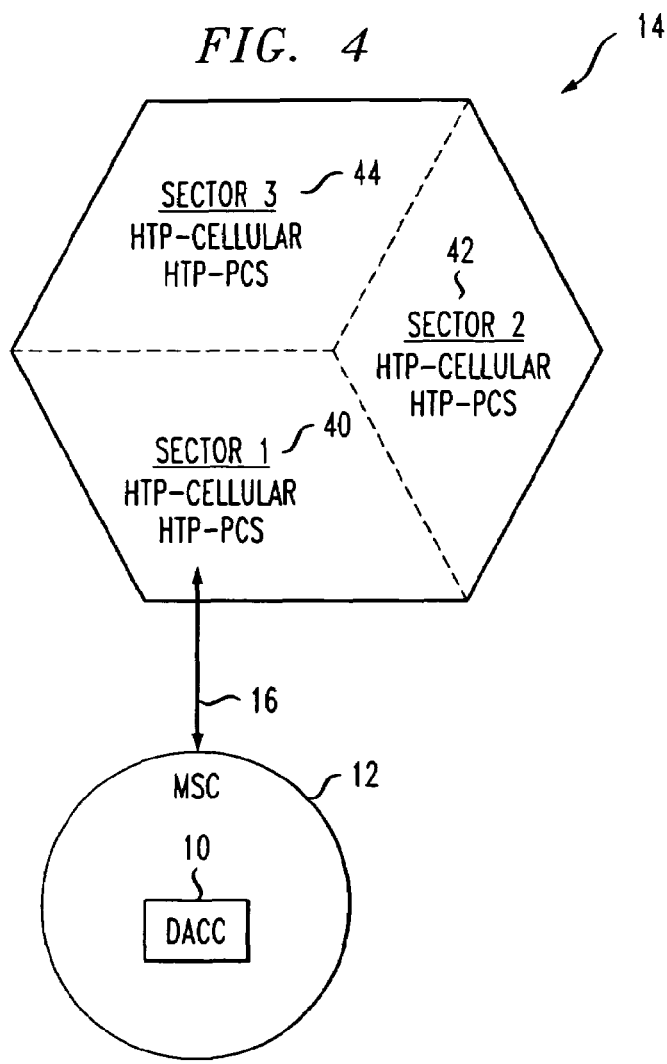
FIG. 4 is a diagram illustrating concepts of the present invention for servicing multiple hyperbands.

FIG. 4 illustrates the organization of a cell according to concepts of the present invention. Cell 14 is divided into 3 sectors 40-44 as above, however, in this embodiment, each sector supports both cellular and PCS hyperbands. Conceptually, however, any number of bands may be supported in each sector and, additionally, it is not necessary for all sectors to be identical to their neighbors with respect to the supported hyperbands. There need not be any relationship between the HTPs supported in the sectors of the same cell. For example, sector 40, numbered 1, may support both the cellular and PCS hyperbands while sector 42, numbered 2, may support only the cellular hyperband. Because the number of sectors supported and the number of HTPs supported in a sector are independent, this implementation will work just as well for single sector, three sector, or six sector cells.

Figure 5:
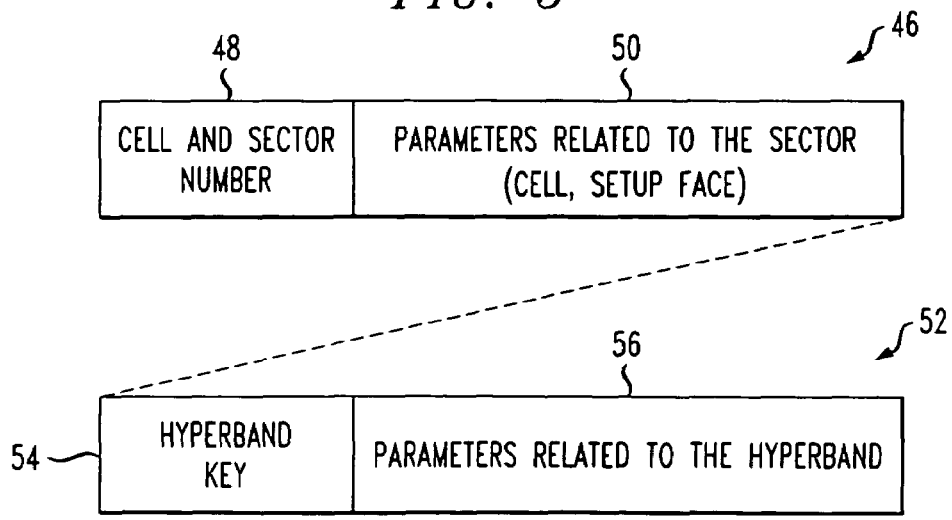
FIG. 5 shows, in summary form, message data structures suitable for use in an embodiment of the present invention.

FIG. 5 illustrates, in summary form, data structures that are used by the Data Administration Call Control 10, at the Mobile Switching Center 12, for messages transmitted over communications link 16. Data structure 46 includes a cell-and-sector key field 48 that contains, for example, a cell site number and a setup face number that uniquely identify a specific cell and sector location. Data structure 46 also includes a set of parameters 50 that are related to the selected cell and sector number, parameters that are not affected by a choice of hyperband, in other words, parameters that are independent of the hyperband. The number of parameters independent of hyperband that must be replicated unnecessarily to support multiple hyperbands according to solutions as shown in FIGS. 2 and 3 is not trivial. There are many parameters associated with the sector that are independent of the hyperband that do not have to be replicated using concepts of the present invention as shown in FIG. 3. For example, hyperband-independent data included in parameters 50 may include:

1. ACC Location Area ID
2. VZID/CID Zone ID
3. Directional Setup Allowed

4. Cell Sector Type
5. Color Codes—Digital
6. Color Codes—1st TDMA Supervisory Digital
7. Color Codes—2nd TDMA Supervisory Digital
8. Control Mobile Attenuation Code
9. Paging—Setup Channel Number
10. Paging—Attenuation Code
11. ACC RAND Broadcast Frequency
12. Active Paging Parameters (11 total)
13. Backup Paging Parameters (11 total)
14. Second Active Paging Parameters (11 total)
15. Second Backup Paging Parameters (11 total)
16. Simulcast Setup Parameters (3 total)
17. TDMA DCCH Channel Number
18. TDMA DCCH Digital Verification Color Code
19. Protocol Version
20. Detection Timer (Seconds)
21. Detection Wait Time (Tics of msec)
22. Complete Candidate List Length
23. Interrogation Response Time—Group 1 Neighbor
24. Group 2 Neighbor
25. Digital Neighbor
26. Series 1 Power Amplifier Identifier
27. Mobile BER High Threshold
28. Mobile BER Low Threshold
29. Public Safety Answering Point—IDDD Destination
30. Primary Dial Class
31. Interexchange Carrier
32. Secondary Dial Class
33. Destination Digits
34. Rate Center
35. Routing Class
36. WIN-Based 911 Phase 1
37. Non-Coded Mobile 911
38. Face in Restricted Access Service Areas (24 total)
39. Group 1 Neighbors (Up to 132 total)
40. Group 2 Neighbors (Up to 132 total)
41. TDMA Flexible Channel Allocation (7 total)
42. TDMA Downlink Dynamic Power Control (TDDPC) (7 total)
43. CDMA Principle Neighbor List (Up to 320)
44. CDMA Alternate Neighbor List 1 (Up to 320)
45. CDMA Alternate Neighbor List 2 (Up to 320)
46. CDMA Directed Handoff Neighbor List (Up to 33)

Data structure 52 includes a hyperband key field 54 that uniquely identifies the hyperband to which the data structure is related. For example, in addition to cell and sector number, key field 54 may contain a letter coding such as C for cellular and P for PCS or, alternately, key field 54 may contain a frequency number specifying the actual frequency. Data structure 52 also includes a set of hyperband related parameters 56 that are, similarly, not affected by or related to a particular cell and sector number. Exemplary data included in parameters field 56 may include:

1. Handoff Type
2. AMPS Sequential Trunk Hunt
3. TDMA Sequential Trunk Hunt
4. Voice Chan. Candidate Selection Thresholds—Primary
5. Primary—Class III/IV
6. Digital Primary
7. BER DPC Threshold offset for VSELP
8. Secondary
9. Thresholds (RSSI)—Setup Voice Channel Confirmation
10. Interference Protection at Handoff(INTPHO)
11. INTPHO—Class III/IV
12. AMPS INLA
13. TDMA INLA
14. Access Signal Strength
15. Access Signal Strength—Class III/IV
16. Upward Hysteresis Adjustment (RSSI)
17. TDMA Upward Hysteresis Adjustment Threshold (RSSI)
18. Voice Chan. Confirmation INTPHO Thresholds (RSSI)—Class I/II
19. Class III/IV
20. Voice Mobile Attenuation Code
21. HOBIT Thresholds—Downlink HOBIT to AMPS
22. Uplink HOBIT to Dual Mode
23. Downlink HOBIT to Dual Mode
24. Power Control State (AMPS Mobile)
25. Power Control State (TDMA Mobile)
26. Power Control State (Cell)
27. Target (RSSI) (AMPS Mobile)
28. Target (RSSI) (TDMA Mobile)
29. Target (RSSI) (Cell)
30. Window (RSSI) (AMPS Mobile)
31. Window (RSSI) (TDMA Mobile)
32. Window (RSSI) (Cell)
33. Slope (AMPS Mobile)
34. Slope (TDMA Mobile)
35. Slope (Cell)
36. Amplifier Power Differential (RSSI)
37. TDMA Target Signal on Handoff (RSSI)
38. BER-Control DPC Feature State
39. Mute Inhibit Indicator
40. Enable MPC/PDE
41. Deactivate Expanded Spectrum Radio Assignment Algorithm Mod
42. Mobile Assisted Handoff List (Up to 308 total)
43. Face in Limited Service Areas (Up to 128 total)
44. Series 2 Cell TDMA Only Information (27 total)
45. Mobile Attenuation Code
46. Mobile Access Threshold
47. Mobile Reselection Threshold
48. Detection Threshold (RSSI)
49. Identification Threshold (RSSI)
50. Radio Reset Threshold (RSSI)

There are several advantages of this approach. This approach does not require the increase of the maximum number of sectors supported in a cell in order to support multiple hyperbands in the same cell. Also if the hyperband key field is properly structured, growth to include future hyperbands can be supported with minimal impact on system design. This approach does not require the data structures for multiple hyperbands to be combined into a single structure. Combining of multiple hyperbands into a single data structure provides difficulty in efficiently engineering and operating the system. Transmission parameters must be duplicated or compromised to accommodate additional hyperbands. Also, the data structures would have to be changed each time additional spectrum is added to the available RF spectrum.

Using the above-described concept, resources may still be pooled on a hyperband basis, which is important because not all mobiles support all hyperbands, and not all services may be supported in all hyperbands. Additionally, it is likely that, although multiple HTPs cover a single RF sector, the coverage of all HTPs serving the RF sector may not be equivalent. Differences in HTP coverage of the RF sector will require some locations to be limited in the HTPs from that RF sector that can be used to serve the user, requiring the system to select from a limited set of the pools of resources in the RF sector. Identification of which HTPs are candidates for a call in an RF sector is based upon signal strength measurements, geo-location services, or other possible future capabilities.

Service and Performance measurements which are provided on a sector can be divided, where pertinent, to a per HTP resolution so that the service provider can determine and control the RF transmission characteristics of each hyperband operating within the RF sector.

Most mobiles support a limited number of neighbors that can be considered as handoff candidates. An advantage of the present invention is that a sector supporting more than one hyperband is considered as only one neighbor handoff candidate. This means that the mobile can only measure the signal strength of only one of the hyperbands, however, this does not create a problem because the signal strength of the other hyperband can be readily inferred from the measured hyperband. Using solutions as illustrated in FIGS. 2 and 3 requires that each individual sector, comprising a single hyperband, must be considered as a separate neighbor handoff candidate, thus limiting the number of sectors that a mobile can consider for handoff operations. Concepts of the present invention, therefore, increase the pool of RF resources that can be considered by the mobile for handoff operations.

Because the second hyperband signal strength (and therefore quality of the handoff candidate) can be inferred from the measurements in the first hyperband, there is information in the hyperband-specific parameter field 56 (see item 42, Mobile Assisted Handoff List, above) that does not apply to the overlaid sectors. It makes more sense in this case to identify the sector, and then just identify what hyperbands that sector supports, instead of identifying two "separate" sectors, which then must somehow be related by the neighboring sector.

Existing software structures, databases, and screens which do not need to differentiate between hyperbands can be left unaffected in many cases (referring to RF sector), and only modified in those cases where the difference is significant, thus truly splitting the view of an RF sector and an HTP. In many cases, such as wireline trunking to a cell/sector, service measurements, status display, and many other operating, administration and maintenance (OA&M) operations, it is not necessary to provide resolution to the hyperband served by a facility to properly operate or maintain that facility. These operations can maintain the RF sector view of the sector, and will be largely unaffected by the changes.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

What is claimed is:

1. A cellular communications network providing multi-hyperband capability, the network comprising:
    a plurality of cells, wherein each cell comprises a plurality of sectors and wherein at least one of the sectors is multi-hyperband capable and supports more than one hyperband;
    a plurality of communications links, each connected to an associated cell; and
    an associated multi-hyperband capable Mobile Switching Center connected to the plurality of cells via the communications links;
    said Mobile Switching Center acting as a data administration and call control system for the plurality of cells such that the Mobile Switching Center controls which sector a mobile station is connected to independent of which hyperband the mobile station will use when the sector is a multi-hyperband capable sector by;
    communicating sector-related parameter messages including a sector-related data structure to a selected cell; and
    communicating hyperband-related parameter messages including a separate hyperband-related data structure to the selected cell.

2. The cellular communications network as set forth in claim 1, wherein the sector-related messages comprise:
    a cell and sector number key field; and
    a plurality of sector-related parameters.

3. The cellular communications network as set forth in claim 1, wherein the hyperband-related messages comprise:
    a hyperband key field, wherein the hyperband key corresponds to one of the hyperbands; and
    a plurality of hyperband-related parameters.

4. The cellular communications network as set forth in claim 1, wherein the more than one hyperband includes a cellular hyperband and a PCS hyperband.

5. A method of supporting multiple hyperbands in a cellular communications network having a plurality of cells, wherein each cell comprises a plurality of sectors and wherein at least one of the sectors is multi-hyperband capable and supports more than one hyperband, a plurality of communications links, each connected to an associated cell, and an associated multi-hyperband capable Mobile Switching Center connected to the plurality of cells via the communications links, the method comprising the step of:
    establishing a sector within a selected cell, via a Mobile Switching Center acting as a data administration and call control system for the plurality of cells, which a mobile station is to be connected to independent of which hyperband the mobile station will use when the sector is a multi-hyperband capable sector by communicating sector-related parameter messages including a sector-related data structure to the selected cell; and
    establishing a hyperband which the mobile station will use by communicating hyperband-related parameter messages including a separate hyperband-related data structure to the selected cell.

6. The method of supporting multiple hyperbands in a cellular communications network as set forth in claim 5, wherein the sector-related messages comprise:
    a cell and sector number key field; and
    a plurality of sector-related parameters.

7. The method of supporting multiple hyperbands in a cellular communications network as set forth in claim 5, wherein the hyperband-related messages comprise:
    a hyperband key field, wherein the hyperband key corresponds to one of the hyperbands; and
    a plurality of hyperband-related parameters.

8. The method of supporting multiple hyperbands in a cellular communications network as set forth in claim 5, wherein the more than one hyperband includes a cellular hyperband and a PCS hyperband.

9. An apparatus comprising a program storage medium readable by a computer and embodying one or more instructions executable by the computer to perform method steps for executing commands to support multiple hyperbands in a cellular communications network having a multi-hyperband capable Mobile Switching center acting as a data administration and call control center via a plurality of communications links connected to associated cells, each cell comprising a plurality of sectors, the method comprising the steps of:

establishing a sector within a selected cell, via the Mobile Switching Center, which a mobile station is to be connected to independent of which hyperband the mobile station will use when the sector is a multi-hyperband capable sector by communicating sector-related parameter messages including a sector-related data structure to the selected cell; and establishing a hyperband which the mobile station will use by communicating hyperband-related parameter messages including a separate hyperband-related data structure to the selected cell.

10. The apparatus as set forth in claim 9, wherein the sector-related messages comprise:

a cell and sector number key field; and a plurality of sector-related parameters.

11. The apparatus as set forth in claim 9, wherein the hyperband-related messages comprise:

a hyperband key field, wherein the hyperband key corresponds to one of the hyperbands; and a plurality of hyperband-related parameters.

12. The apparatus as set forth in claim 9, wherein the multiple hyperbands include a cellular hyperband and a PCS hyperband.

13. A cellular communications network comprising:

a plurality of geographically distinct cells which each support a plurality of hyperbands and which each comprise a plurality of sectors, at least one of the sectors supporting a plurality of hyperbands;

a means for controlling call administration within the cell, said means employing a data structure wherein said means sends and receives sector-related parameter messages to and from the plurality of distinct cells separately from hyperband-related parameter messages;

a means for assigning a sector within a selected cell which a mobile station is to be connected to independent of which hyperband the mobile station will use when the sector supports multiple hyperbands by communicating said sector-related parameter messages to the selected cell; and a means for assigning a hyperband within the assigned sector which the mobile station is to use by communicating said hyperband-related parameter messages to the selected cell.

14. The cellular communications network as set forth in claim 13, wherein said means for controlling call administration comprises a Mobile Switching Center acting as a data administration and call control system for the plurality of cells.

15. The cellular communications network as set forth in claim 13, wherein the sector-related parameter messages comprise:

a cell and sector number key field; and a plurality of sector-related parameters.

16. The cellular communications network as set forth in claim 13, wherein the hyperband-related parameter messages comprise:

a hyperband key field, wherein the hyperband key corresponds to one of the hyperbands; and a plurality of hyperband-related parameters.

\* \* \* \* \*